United States Patent
Leder et al.

(10) Patent No.: US 11,522,454 B2
(45) Date of Patent: Dec. 6, 2022

(54) BIAS GENERATOR

(71) Applicant: THERMO FISHER SCIENTIFIC MESSTECHNIK GMBH, Erlangen (DE)

(72) Inventors: Erich Leder, Heroldsbach (DE); Greg H. Nelson, Ithaca, NY (US)

(73) Assignee: Thermo Fisher Scientific Messtechnik GmbH, Erlangen (DE)

( * ) Notice: Subject to any disclaimer, the term of this patent is extended or adjusted under 35 U.S.C. 154(b) by 39 days.

(21) Appl. No.: 17/101,386

(22) Filed: Nov. 23, 2020

(65) Prior Publication Data

US 2021/0159791 A1    May 27, 2021

Related U.S. Application Data

(60) Provisional application No. 62/941,154, filed on Nov. 27, 2019.

(51) Int. Cl.
*H02M 3/158* (2006.01)
*H02M 3/335* (2006.01)

(52) U.S. Cl.
CPC ....... *H02M 3/158* (2013.01); *H02M 3/33523* (2013.01)

(58) Field of Classification Search
CPC .. H02M 3/158; H02M 3/33523; H02M 3/157; H02M 3/156
See application file for complete search history.

(56) References Cited

U.S. PATENT DOCUMENTS

| | | | |
|---|---|---|---|
| 8,395,127 B1 | 3/2013 | Frach et al. | |
| 9,835,735 B2 | 12/2017 | Preston | |
| 2004/0135565 A1* | 7/2004 | Douma | H02M 3/157 323/283 |
| 2008/0246751 A1* | 10/2008 | Lee | G05F 1/70 345/212 |
| 2009/0309567 A1* | 12/2009 | Morroni | H02M 3/157 323/283 |
| 2013/0234691 A1* | 9/2013 | Carroll | H02M 3/1588 323/283 |
| 2014/0239825 A1* | 8/2014 | Choi | H02M 3/1582 363/44 |
| 2015/0285922 A1 | 10/2015 | Mintzer et al. | |
| 2017/0199284 A1* | 7/2017 | Silari | G01T 1/2018 |
| 2018/0120454 A1* | 5/2018 | Mueller | G01T 1/175 |
| 2018/0267174 A1* | 9/2018 | Liang | G01T 3/065 |
| 2020/0035473 A1* | 1/2020 | Deford | H01J 49/025 |
| 2021/0156972 A1* | 5/2021 | Droz | G01J 1/46 |

FOREIGN PATENT DOCUMENTS

WO    WO-2019013629 A2    1/2019

OTHER PUBLICATIONS

PCT/EP2020/083098, International Search Report and Written Opinion, dated Apr. 8, 2021, 14 pages.

* cited by examiner

*Primary Examiner* — Nguyen Tran

(57) ABSTRACT

A switching mode power supply includes a microcontroller, an interface circuit connected to the controller, and a boost circuit connected to the controller. A feedback circuit is connected to the controller, and an SiPM is connected to the boost circuit and the feedback circuit.

14 Claims, 4 Drawing Sheets

BIAS GENERATOR

CROSS-REFERENCE TO RELATED APPLICATIONS

This application claims priority to U.S. application No. 62/941,154 filed Nov. 27, 2019, which disclosure is herein incorporated by reference in its entirety.

FIELD

Aspects of this disclosure relate generally to switching mode power supplies, and more particularly, switching mode power supplies for SiPM bias generation that provide high efficiency.

BACKGROUND

Silicon photomultipliers (SiPMs) are used throughout various industries to detect radiation and light, for example. In certain areas, SiPMs may be used to detect thermoluminescence by measuring infrared light. SiPMs may also be used in gamma ray detectors or dosimeters for determining radiation levels in hazardous environments, which is useful in helping to protecting users from exposure to such radiation. Gamma ray detectors exploit atomic or molecular excitation produced by radiation passing through a scintillation material. Subsequent de-excitation generates photons that can be measured to give an indication of the energy deposited in the detector by the radiation. A detector may include scintillation material, such as sodium iodide (NaI), cesium iodide (CsI), or certain plastics, coupled to a silicon device, which acts as a photomultiplier. When the detector is exposed to radiation, the scintillation material is excited, generating photons of visible light. This light then strikes the photomultiplier, which amplifies the result and generates a signal that can be measured.

Portable versions of such devices are often carried by an individual, including electronic personal dosimeters (EPDs), personal radiation detectors (PRDs), and radioisotope identifiers (RIIDs). These devices require batteries in the remote environments in which they operate and, therefore, providing long life for the batteries in such operating conditions is highly advantageous.

A SiPM needs a bias voltage, typically in the range of 25-35V, with a very low current, ranging from nA to at most about 1 mA. For battery-operated devices, this voltage must be generated from a much lower battery voltage, typically in the range of 1.0-5.0V. Most commercially available boost electronic integrated circuits (ICs) are designed for lower voltage (e.g. boosting from 1.0V to 3.3V) and/or higher current (e.g. specified for a load of 10 mA to several amps), and do not perform the task of providing SiPM bias in an efficient way that conserves battery power. Known boost circuits often have an output current that is too low, and may draw more power to convert the voltage that is needed for the load of the SiPM, resulting in a very low efficiency.

Additionally, the bias voltage for the SiPM generally needs to be adjusted to compensate for changes in the operating temperature of the device. This kind of adjustment is only sometimes supported by commercial boost ICs, and often requires the addition of components (such as digital-to-analog converters or digital potentiometers) which add cost, power consumption, and size to a design.

It would be desirable to provide a bias generator that reduces or overcomes some or all of the difficulties in prior known designs. Particular objects and advantages will be apparent to those skilled in the art, that is, those who are knowledgeable or experienced in this field of technology, in view of the following disclosure and detailed description of certain embodiments.

SUMMARY

In accordance with a first aspect, a switching mode power supply includes a microcontroller, an interface circuit connected to the controller, a boost circuit connected to the controller, and a feedback circuit connected to the controller. An SiPM is connected to the boost circuit and the feedback circuit.

Aspects disclosed herein provide a low cost and efficient device that can provide a voltage bias for an SiPM and other devices. These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
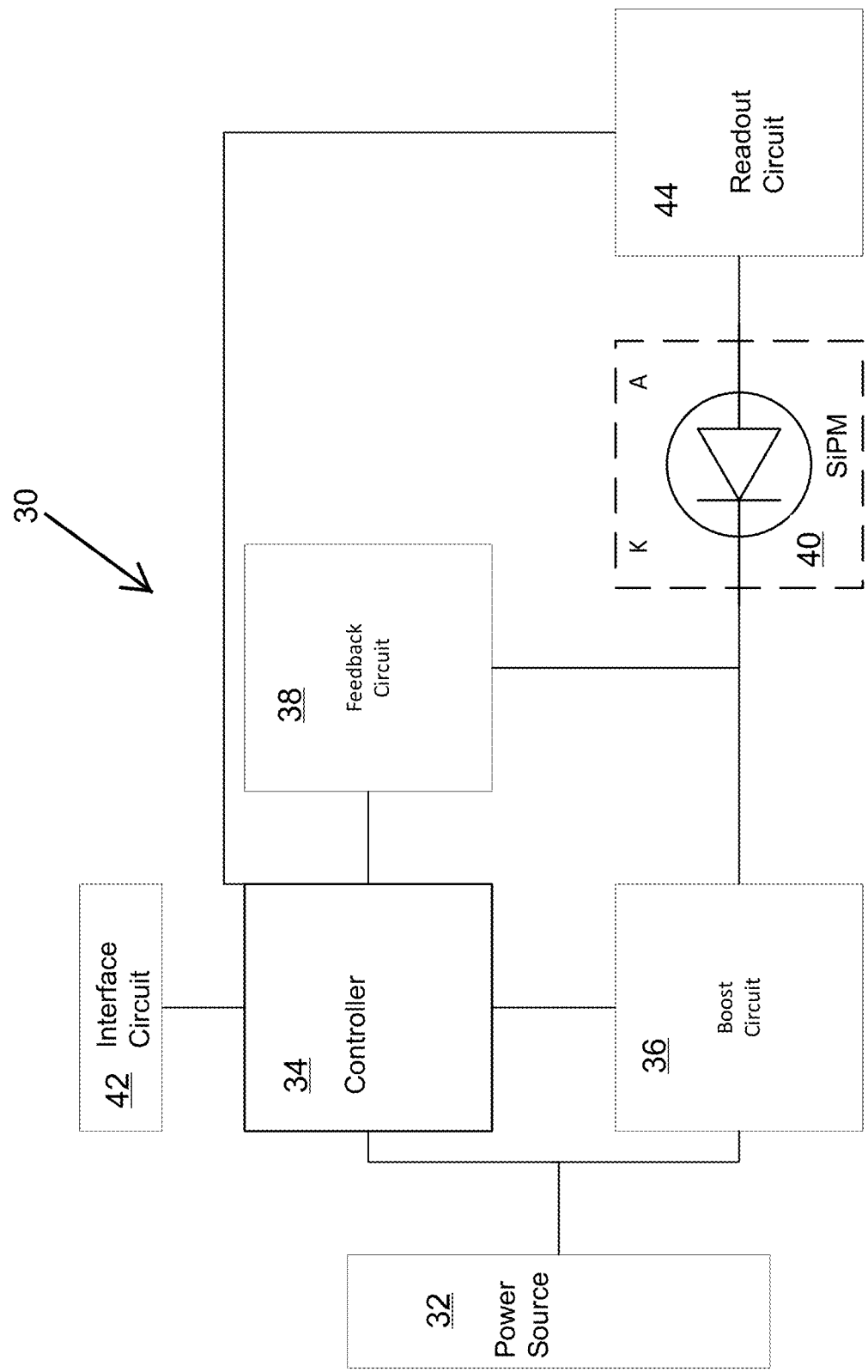
FIG. 1 is a schematic diagram of elements of a bias generator.

The figures referred to above are not drawn necessarily to scale, should be understood to provide a representation of particular embodiments, and are merely conceptual in nature and illustrative of the principles involved. Some features depicted in the drawings have been enlarged or distorted relative to others to facilitate explanation and understanding. The same reference numbers are used in the drawings for similar or identical components and features shown in various alternative embodiments. Bias generators as disclosed herein would have configurations and components determined, in part, by the intended application and environment in which they are used.

DETAILED DESCRIPTION OF EMBODIMENTS

Embodiments disclosed herein provide an interactive, high-efficiency bias generator useful in conjunction with an SiPM that (a) provides the voltage and current needed for an SiPM very efficiently from a battery source; (b) allows the voltage to be adjusted without additional components; (c) provides an ability to read out the average current or the total charge in an interval, in a manner that may be used as part of a higher-level measurement; and (d) can be switched between different operating modes, which can be optimized for different conditions. These conditions might include, for example, low current "background" radiation, high current "pulsed" radiation, or high precision "spectroscopic" measurement. Thus, such a bias generator allows for the bias for the SiPM to be generated efficiently, with direct control over the output voltage, and with a capability for measuring the current or power consumption of the SiPM.

Bias generators as discussed herein may be used with small SiPMs, such as those used in EPDs and PRDs. It is to be appreciated that bias generators as discussed herein may also be used for higher power level devices, such as spectroscopic devices, for example.

As illustrated in FIG. 1, a bias generator 30 may include a power source 32 and a controller 34, with a boost circuit 36 and a feedback circuit 38 connected to an SiPM 40. Bias generator 30 may also include an interface circuit 42, and a readout circuit 44 that is connected to SiPM 40. In certain embodiments, power source 32 may be a battery. For example, power source 32 may have a voltage between approximately 1.0 V and approximately 4.2 V. In other embodiments, power source 32 may be a mains-powered DC supply. Other suitable power sources will become readily apparent to those skilled in the art, given the benefit of this disclosure.

Controller 34 may be a low power microcontroller unit ("MCU"). An exemplary MCU is the C8051F980-GM 8-bit microcontroller, available from Silicon Labs of Austin, Tex. In other embodiments, controller 34 may instead, or in addition, include a field-programmable gate array ("FPGA"), or an application-specific integrated circuit ("ASIC"). Controller 34 may also include a measurement device, such as an analog-to-digital converter ("ADC"), a comparator, such as an analog comparator, or a combination of these. Controller 34 may also additionally include an event-counting device, which may be an interrupt signal or a counter, e.g., a digital counter, that responds to SiPM photon detection. In certain embodiments, the measurement device is an ADC and the event-counting device is a digital counter, integrated into the same commercially available module with the interface, an MCU and potentially other peripheral functions. The use of a low power MCU and its components allows measurement of the performance and real-time control of bias generator 30, while providing boost functionality.

Boost circuit 36, which provides a bias voltage of between approximately 25V and approximately 35 V to SiPM 40, may include one or more inductors, capacitors, transistors, diodes, and other discrete components. In certain embodiments, boost circuit 36 may be a conventional "asynchronous boost" circuit including an inductor, an N-channel logic-level Field Effect Transistor ("FET"), a diode, input and output capacitors, and possibly current-limiting resistors. In other embodiments, boost circuit 36 could be a "synchronous boost" circuit using two or more transistors; a "flyback" circuit using a transformer, FET, and diodes; or a "voltage multiplier" circuit using four or more diodes and four or more capacitors.

Feedback circuit 38 may include one or more resistors. In certain embodiments, feedback circuit 38 may include two resistors of high resistance values, and a buffer amplifier that provides the output that is sent to the control circuit.

Interface circuit 42 may provide for control of the bias voltage to be developed, as well as provide for the monitoring of the performance of the SiPM (e.g. voltage, current, power, etc.). Interface circuit 42 may include one or more connections to controller 34, organized according to a standard, including, for example, Serial Peripheral Interconnect (SPI), System Management Bus (SMB), asynchronous RS-232 or RS-485 serial, or other public or proprietary standards. In certain embodiments, this interface is an SPI interface including a data input line, a data output line, a clock line, and a select line.

Figure 2:
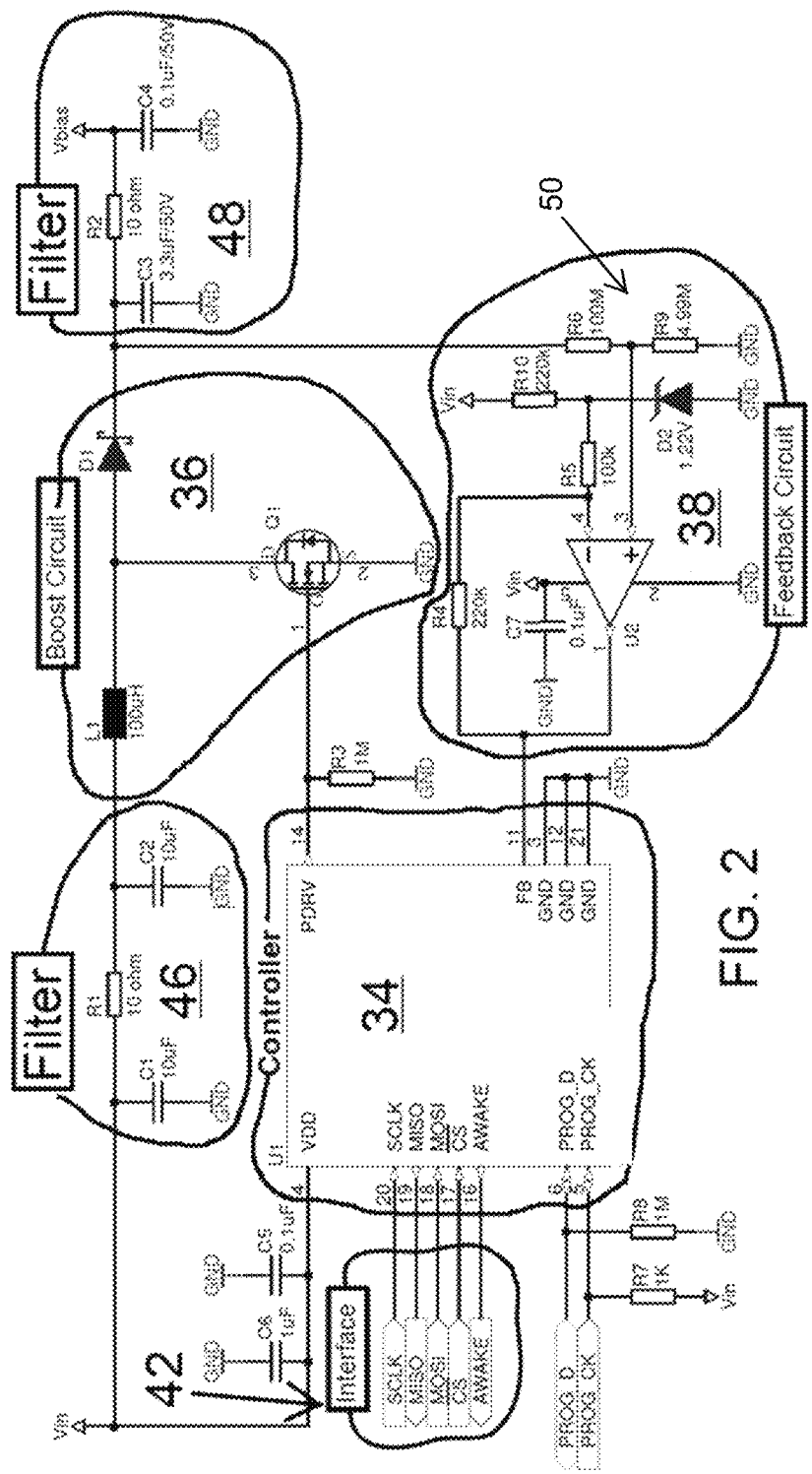
FIG. 2 is a schematic diagram of an embodiment of a circuit of the bias generator of FIG. 1.

Components of an exemplary circuit of bias generator 30 are illustrated in FIG. 2. As noted above, controller 34 may be a low power MCU with a plurality of pins. In certain embodiments fewer than all of the pins of controller 34 are in use. For example, controller 34 may include 20 pins, with only 13 pins being used. As illustrated here, pins 3, 12, 21 of controller 34 may be connected to ground. Pin 4 of controller 34 may be an IC power supply input. Pins 5 and 6 of controller 34 may be programming pins, which may be used to load firmware for controller 34. Pin 11 of controller 34 may be connected to feedback circuit 38, and receive the voltage feedback of the adjustable voltage of bias generator 30. Pin 16 of controller 34 may be an SPI ready-to-receive signal, used for waking controller 34 from a sleep mode. Pin 17 of controller 34 may be an SPI chip select, which provides for selecting the device for controller 34 to communicate with. Pin 18 of controller 34 may be an SPI master-out, slave-in ("MOST") data output line. Pin 19 of controller 34 may be an SPI master-in, slave-out ("MISO) data input line. Pin 20 of controller 34 may be an SPI clock pin.

Controller 34 may include a pair of resistors R7, and R8 that keep the programming lines of pins 5, 6, respectively, of controller 34 in a known, low-power state. In certain embodiments resistor R7 may be a 1K ohm resistor, and R8 may be a 1M ohm resistor. A pair of bypass capacitors C5 and C6 may be connected near pin 4 of controller 14. Capacitor C5 may be a 0.1 µF capacitor, and capacitor C6 may be a 1 µF capacitor in certain embodiments. A resistor R3 may be positioned proximate pin 14 and serve to pull down the gate of a FET of boost circuit 36 (described in greater detail below) to ensure that it does not turn on while controller 34 is being initialized.

Boost circuit 36 may include an inductor L1, a diode D1, and a FET Q1, as seen in FIG. 2. Inductor L1 may be a 100 µH inductor in certain embodiments. Diode D1 may be a Schottky barrier diode with a low forward voltage drop in certain embodiments. An exemplary FET Q1 may be an N-channel FET Model RTF016N05T1, available from Rohm Semiconductor, of Kyoto, Japan. In certain embodiments, boost circuit 36 may include a first filter 46, which may include a resistor R1 positioned between a capacitor C1 and a capacitor C2, and may serve to reduce the peak current drawn by boost circuit 36 from the supply voltage Vin. Resistor R1 may be a 10 ohm resistor, capacitor C1 may be a 10 µF capacitor, and C2 may be a 10 µF capacitor in certain embodiments.

Boost circuit 36 may include a second filter 48, which may include a resistor R2 positioned between a capacitor C3 and a capacitor C4, and may serve to help stabilize the output voltage $V_{bias}$. Resistor R2 may be a 10 ohm resistor, capacitor C1 may be a 3.3 µF capacitor, and C2 may be a 0.1 µF capacitor in certain embodiments.

Feedback circuit 38 may include a high resistance voltage divider 50 formed of resistors R6 and R9 followed by a low-power, low-bandwidth operational amplifier U2. An exemplary amplifier is the TLV8541DBVR operational amplifier, available from Texas Instruments of Dallas, Tex. In certain embodiments, resistor R6 may be a 100M ohm resistor and resistor R9 may be a 4.99M ohm resistor. Amplifier U2 may also be provided with a bypass capacitor C7. In certain embodiments, capacitor C7 may be a 0.1 µF capacitor. Amplifier U2 may also include a diode D2, and resistors R10, R5, and R4. An exemplary diode is the ZXRE1004 diode available from Diodes Incorporated, of Plano, Tex. In certain embodiments, resistor R10 may be a 220 k ohm resistor, resistor R5 may be a 100 k ohm resistor, and resistor R4 may be a 220 k ohm resistor. In certain embodiments, feedback circuit 38 may draw a load that is less than an amount of power used by SiPM 40. Feedback circuit 38 may use an offset to increase precision of a voltage measurement in a useful range of SiPM 40.

Figure 3:
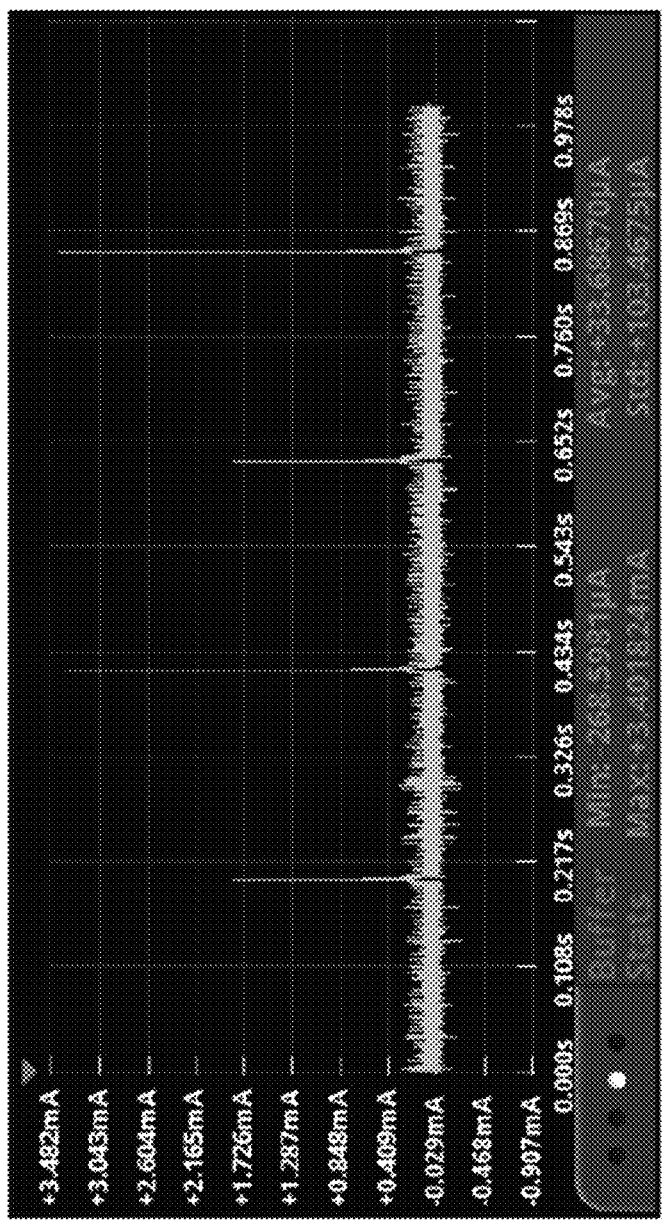
FIG. 3 is a graph illustrating the current draw for an embodiment of the bias generator of FIG. 1.

FIG. 3 illustrates the current draw of bias generator 30. Bias generator 30 may operate by moving in and out of a sleep state, e.g., at a 3 hz boost rate. From the sleep state, the system wakes, takes a reading and determines whether or not boost circuit 36 is required to provide a bias voltage, provides the boost voltage if needed and takes a reading to evaluate the effectiveness of the boost, and then returns to the sleep state. When controller 34 is wakened from a sleep state it may sample the feedback voltage with its ADC and compare the value of the feedback voltage to a voltage setpoint to determine if a boost in the voltage is needed. Internal algorithms of controller 34 may then be used to adjust the pulse frequency to match the output load. It is to be appreciated that controller 34 may include non-volatile memory that can be altered to implement different algorithms.

Figure 4:
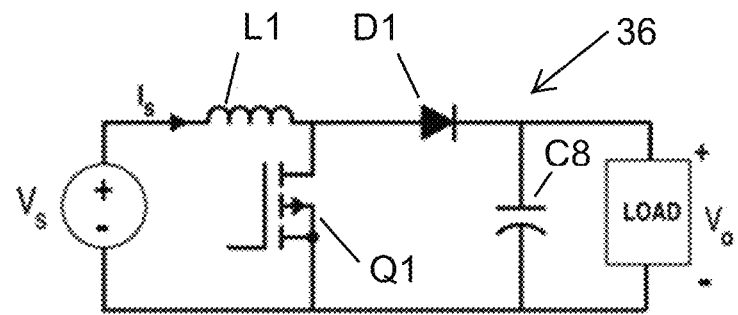
FIG. 4 is a circuit diagram of a boost topology used for the boost circuit of the bias generator of FIG. 2.

It is to be appreciated that the various topologies may be used for boost circuit 36. The boost circuit topology utilized in the embodiment described above with respect to FIG. 2 is seen in FIG. 4, shown with a voltage source $V_s$ and voltage output $V_o$, and includes an inductor L1, a diode D1, a FET Q1, and a capacitor C8.

Figure 5:
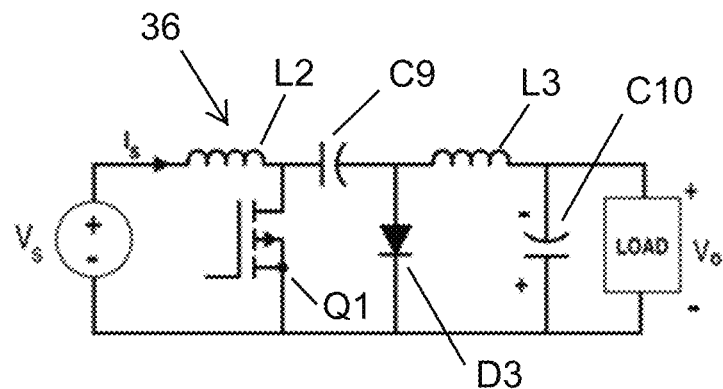
FIG. 5 is a circuit diagram of an alternative topology used for the boost circuit of the bias generator of FIG. 2.

Another embodiment that may be used is a cuk topology, as illustrated in FIG. 5. This embodiment of boost circuit 36, shown with voltage source $V_s$ and voltage output $V_o$, includes a pair of inductors L2, L3, a pair of conductors C9, C10, FET Q1, and a diode D3.

Figure 6:
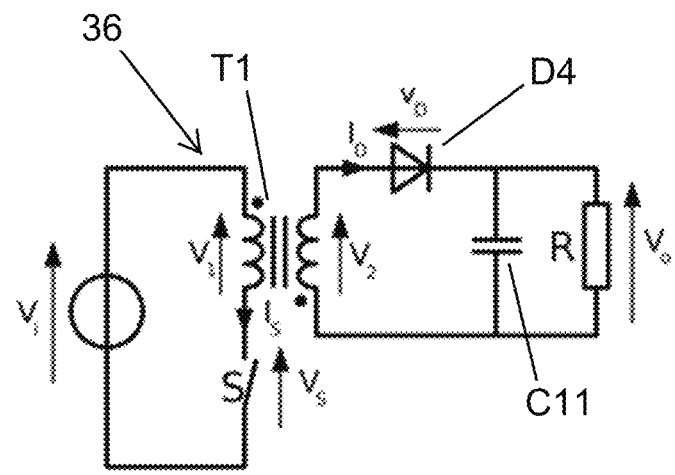
FIG. 6 is a circuit diagram of another alternative topology used for the boost circuit of the bias generator of FIG. 2.

Yet another embodiment for boost circuit 36 is a flyback topology, as illustrated in FIG. 6. This embodiment of boost circuit 36, shown with voltage source V1 and voltage output $V_o$ across resistor R, includes a transformer T1, a switch S, a diode D4, and a capacitor C11.

It is to be appreciated that boost circuit 36 may use other topologies, and that other suitable topologies will become readily apparent to those skilled in the art, given the benefit of this disclosure.

Bias generator 30 may be used to provide boost voltage for various devices including small SiPMs that have low current demand (e.g., on the order of a few hundred nA) to on demand spectroscopic devices that require high performance and stability of ripple of the bias voltage. For example, when implementing bias generator 30 in a PRD mode that is simply providing a count of detection events, efficiency may be of primary concern. When implementing bias generator 30 with a spectroscopic PRD, higher power requirements may result due to a more complex mode of operation that is not simply counting detection events but is also concerned with determining what is actually being detected. In such an embodiment, the performance of the circuit is modified by the higher level demands of the application of bias generator 30. It is to be appreciated that in certain embodiments, e.g., when used with an EPD, bias generator 30 may be operated continuously whether dose rates are low, where the current requirement is low, or are high, where the current requirements increase, without changing an operating mode of bias generator 30.

The current consumption of SiPM 40 provides a feedback signal that can provide additional information on the operation of bias generator 30. If SiPM 40 is being used in a counting mode, the total integrated Coulombs of charge is generally very linearly coupled with the total number of events and their cumulative intensity. Thus, in the example where SiPM 40 is being used as part of a radiation detector, the current (nA) is a very good indicator of the dose exposure rate (µSv/h) and can be used as a surrogate measurement at rates where the ability to count individual photons is no longer possible.

When SiPM 40 is used in applications with low background event rates (one/minute or lower at background dose exposure in radiation measurement), the occurrence of a photon event can be used as a trigger for moving bias generator 30 into a more active control regime. Because these events are rare, they have little impact on the average power consumption; but when a non-background condition occurs, they provide a mechanism for switching bias generator 30 to a more closely-coupled regulation regime. Thus, when used with a spectroscopic PRD, bias generator 30 may be switched back and forth between a background, or low power mode, and a more active or low ripple mode. The switch between a background mode and a more active mode may be triggered, for example, when the photon event activity rises above a preselected level or rate, or when the user selects a specific operation such as spectroscopic measurement.

Embodiments of bias generator 30 as disclosed herein may provide significant advantages. The use of a low cost MCU for controller 34 may provide extensive operational and monitoring capabilities that can increase the performance of bias generator 30, while decreasing the overall costs of the system. In certain embodiments, the efficiency of bias generator 30 may be much greater than other supplies that are not designed for this purpose. For example, a typical commercial off-the-shelf ("COTS") "ultra-low power" boost converter draws over 500 uW at no load. Embodiments of bias generator 30 as described herein may draw less than 20% of the power at no load.

Because the boost frequency and duty cycle can be controlled by any of a number of possible algorithms implemented in controller 34, it is not limited to a fixed switching frequency (pulse width modulation or "PWM"), fixed on-time (pulse frequency modulation or "PFM"), or other approaches that are typically implemented with purely analog control loops, and can select optimal algorithms for different operating points. In particular, selected algorithms allow for an event-count input which allows it to switch from a lowest-power background mode to a higher-power active mode in response to one or more photons being detected by the SiPM.

Bias generator 30 can be directly adjusted without the need for additional components. For the case of a SiPM that requires bias adjustment to correct for operating temperature, this reduces the cost, circuit complexity, and power consumption relative to a circuit that explicitly controls the bias either through a temperature-dependent resistor or through a DAC or digital potentiometer used to control a COTS boost converter.

As an added benefit from the use of common components, multiple different products can be built around the same components, even when the products require different algorithms. By replacing control software while retaining the same controller component, manufacturing inventory is kept smaller and more agile, and, therefore, costs may be reduced.

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the invention. Substitutions of elements from one described embodiment to another are also fully intended and contemplated. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples, but are encompassed by the following claims.

What is claimed is:

1. A switching mode power supply comprising:
   a microcontroller;
   an interface circuit connected to the microcontroller;
   a boost circuit connected to the microcontroller;
   a feedback circuit connected to the microcontroller;
   a readout circuit connected to the microcontroller; and
   an SiPM connected to the boost circuit, the readout circuit and the feedback circuit,
   wherein the microcontroller is configured to control the boost circuit to switch between a first operating mode and a second operating mode,
   wherein the switch between a first operating mode and a second operating mode is initiated when the SiPM detects photon event activity greater than a preselected level, and
   wherein the preselected level is a background dose exposure in radiation measurement.

2. The switching mode power supply of claim 1, wherein the microcontroller contains non-volatile memory that can be altered to implement different algorithms.

3. The switching mode power supply of claim 1, wherein the microcontroller contains an ADC.

4. The switching mode power supply of claim 1, wherein the microcontroller contains an analog comparator.

5. The switching mode power supply of claim 1, wherein the feedback circuit draws a load that is less than an amount of power used by the SiPM.

6. The switching mode power supply of claim 1, wherein the feedback circuit utilizes an offset to increase precision of a voltage measurement in a useful range of the SiPM.

7. The switching mode power supply of claim 1, wherein the boost circuit comprises an inductor, a diode, and a FET.

8. The switching mode power supply of claim 7, wherein the boost circuit further comprises a first filter connected to the inductor, the first filter including a resistor positioned between a pair of capacitors.

9. The switching mode power supply of claim 7, wherein the boost circuit further comprises a second filter connected to the diode, the second filter including a resistor positioned between a pair of capacitors.

10. The switching mode power supply of claim 1, wherein the feedback circuit comprises a high voltage divider including a pair of resistors, and an amplifier.

11. The switching mode power supply of claim 10, wherein the amplifier is a low-power, low-bandwidth operational amplifier.

12. The switching mode power supply of claim 10, wherein the feedback circuit includes a bypass capacitor.

13. The switching mode power supply of claim 1, wherein the first and second operating modes comprise a background mode and an active mode.

14. The switching mode power supply of claim 1 wherein the background dose is one event per minute.

* * * * *